(12) United States Patent
Saarloos et al.

(10) Patent No.: US 12,020,225 B2
(45) Date of Patent: Jun. 25, 2024

(54) RFID DETECTION OF ARTICLES WITHOUT A DATABASE

(71) Applicant: Sensormatic Electronics, LLC, Boca Raton, FL (US)

(72) Inventors: Cor Saarloos, Deventer (NL); Michael French, Quorn (GB); Steve E. Trivelpiece, Rancho Santa Margarita, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 297 days.

(21) Appl. No.: 17/493,454

(22) Filed: Oct. 4, 2021

(65) Prior Publication Data
US 2023/0106047 A1  Apr. 6, 2023

(51) Int. Cl.
| | |
|---|---|
| *G06Q 20/18* | (2012.01) |
| *G06K 7/10* | (2006.01) |
| *G06Q 20/20* | (2012.01) |
| *G07C 9/29* | (2020.01) |
| *G07G 1/00* | (2006.01) |
| *G07G 3/00* | (2006.01) |

(52) U.S. Cl.
CPC ......... *G06Q 20/18* (2013.01); *G06K 7/10366* (2013.01); *G06Q 20/208* (2013.01); *G07C 9/29* (2020.01); *G07G 1/009* (2013.01); *G07G 3/003* (2013.01)

(58) Field of Classification Search
CPC .. G06Q 20/18; G06Q 20/208; G06K 7/10366; G06K 19/0723; G07C 9/29; G07G 3/003; G07G 1/009
See application file for complete search history.

(56) References Cited

U.S. PATENT DOCUMENTS

| | | | |
|---|---|---|---|
| 2014/0172610 A1* | 6/2014 | Carpenter | G06Q 20/40 705/26.1 |
| 2015/0187193 A1* | 7/2015 | Oozawa | G08B 13/248 340/572.3 |
| 2017/0053506 A1* | 2/2017 | Alexis | G08B 13/246 |
| 2018/0158302 A1* | 6/2018 | Hosseini | G08B 13/2451 |
| 2019/0114488 A1* | 4/2019 | Glazer | G07G 1/0036 |
| 2020/0265404 A1* | 8/2020 | Komori | G06Q 20/209 |
| 2020/0286059 A1* | 9/2020 | Bengtsson | G06F 21/554 |
| 2021/0287473 A1* | 9/2021 | Ragusa | G06Q 20/202 |

FOREIGN PATENT DOCUMENTS

WO     2018013046 A1     1/2018

OTHER PUBLICATIONS

International Search Report and Written Opinion in PCT/US2022/077512, dated Jan. 13, 2023, 12 pages.

\* cited by examiner

*Primary Examiner* — Michael Jared Walker
(74) *Attorney, Agent, or Firm* — ARENTFOX SCHIFF LLP

(57) ABSTRACT

Apparatus and methods for self-checkout at a retail establishment includes receiving, by a sensor gate and from a payment processing device, purchase transaction information related to a purchase by a customer. The sensor gate scans customized label attached to each article possessed by the customer located in a surveillance zone of the retail establishment. The sensor gate compares information contained in the customized label with the received purchase transaction information.

14 Claims, 4 Drawing Sheets

RFID DETECTION OF ARTICLES WITHOUT A DATABASE

TECHNICAL FIELD

The present disclosure generally relates to Radio Frequency Identification ("RFID") tags for article surveillance and/or tracking systems, and more specifically, to RFID detection of articles without a database.

BACKGROUND

A conventional Electronic Article Surveillance ("EAS") system in a retail setting may comprise a monitoring system and at least one RFID tag or label attached to an article to be protected from unauthorized removal of the article from the store. The monitoring system establishes a surveillance zone in which the presence of RFID tags and/or labels can be detected. The surveillance zone is usually established at an access point for the controlled area (e.g., adjacent to a retail store entrance and/or exit). If an article enters the surveillance zone with an active RFID tag and/or label, then an alarm may be triggered to indicate possible unauthorized removal thereof from the controlled area. In contrast, if an article is authorized for removal from the controlled area, then the RFID tag and/or label thereof can be deactivated. Consequently, the article can be carried through the surveillance zone without being detected by the monitoring system and/or without triggering the alarm.

Various solutions have been derived for tracking RFID tags present within the controlled area. One such solution involves discovering RFID tags using an RFID interrogator. RFID protocols employed by this solution work well for a small number of RFID tags in a physically controlled environment. However, in environments with a relatively large number of visible and/or moving RFID tags, there are severe limitations in tracking articles and detecting theft in a crowded retail facility.

In view of the foregoing, there is a need for a more dynamic approach to shrink loss reduction and/or to increase checkout productivity.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure relates to particular information, such as, for example, a category of a tagged article, associated with an RFID sensor to be used with a gate exit system of a retail establishment. A tagged article is a tangible article that carries a self-identifying tag (e.g., an RFID tag). In some cases, self-identifying information can simply include a category of the tagged article.

One example implementation relates to a method for self-checkout at a retail establishment. One aspect of the method includes receiving, by a sensor gate and from a payment processing device, purchase transaction information related to a purchase by a customer. The sensor gate scans a customized label attached to each article possessed by the customer located in a surveillance zone of the retail establishment. The sensor gate compares information contained in the customized label with the received purchase transaction information.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Aspects of the disclosure will now be described with respect to FIGS. 1-4. Aspects generally relate to novel systems and methods for self-checkout at a retail establishment using a RFID tag affixed to an object. The RFID tags include, but are not limited to, security tags, security labels, inventory RFID tags, inventory control labels, and any other tag/label which can be coupled with or affixed to an object.

Various methods described herein overcome various drawbacks of conventional object tracking techniques. For example, conventional object tracking techniques generally involve reading all tags located in a surveillance area, and then determine which of one or more of tag(s) have been removed from the room or space. In contrast, the methods involve reading only customized information of interest (e.g., category of an article) from each RFID tag located in the surveillance zone so as to compare with checkout information. Consequently, the methods of the present disclosure are significantly less time consuming and error prone as compared to the conventional inventory tracking technique.

Figure 1:
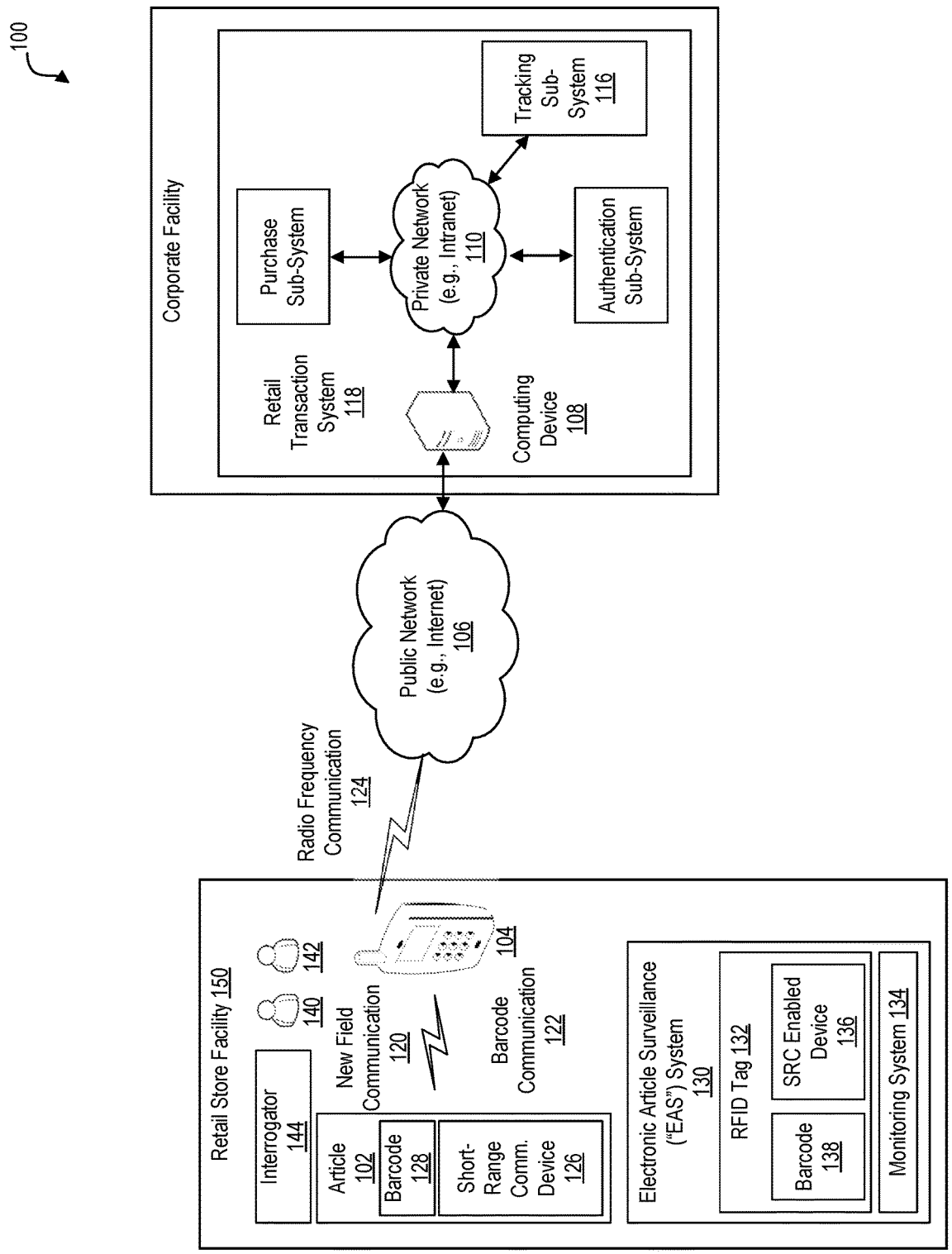
FIG. 1 is a schematic illustration of an exemplary EAS system according to one aspect of the present disclosure.

Referring now to FIG. 1, there is provided a schematic illustration of an exemplary EAS system according to one aspect of the present disclosure. As noted above, aspects of the present disclosure concern systems and methods for RFID detection of articles without a database. Prior to discussing such systems and methods, a brief discussion of an overall EAS system is provided to assist a reader in understanding an exemplary retail store environment in which the disclosed system can be employed. Notably, the present disclosure is not limited to retail store applications. Aspects of the present disclosure can be used in any application in which motion of an object, a person, and/or equipment needs to be reported and/or tracked (e.g., a stock room application, loading dock application, and/or surveillance/security application). As would be understood by a person skilled in the art, the RFID tag can be modified from what is described herein in accordance with any application. For example, the RFID tag is described as comprising a retail store RFID tag which is able to communicate with a Point Of Sale ("POS") device. In other applications, the RFID tag may not have this capability.

In the retail store scenarios, the system 100 is generally configured to allow a customer to purchase an article 102 using wireless communication technology. The wireless communication technology can include, but is not limited to, a wireless Short Range Communication ("SRC") technology and/or mobile communication technology. The SRC technology includes, but is not limited to, RFID technology, barcode technology, Near Field Communication ("NFC") technology, InfraRed ("IR") technology, Wireless Fidelity ("Wi-Fi") technology, Bluetooth technology, and/or ZigBee technology. In the RFID scenarios, considering the current tag design/technology and sensitivity of common interrogators, the communications range can fall within 1 inch to 50 feet, for example. The mobile communication technology can include, but is not limited to, Radio Frequency ("RF") communication technology.

As shown in FIG. 1, system 100 comprises a retail store facility 150 including an EAS 130. The EAS 130 comprises a monitoring system 134 and at least one RFID tag 132. Although not shown in FIG. 1, the RFID tag 132 is attached to article 102, thereby protecting the article 102 from an unauthorized removal from the retail store facility 150. The monitoring system 134 establishes a surveillance zone (not shown) within which the presence of the RFID tag 132 can be detected. The surveillance zone is established at an access point (not shown) for the retail store facility 150. If the RFID tag 132 is carried into the surveillance zone, then an alarm is selectively triggered to indicate a possible unauthorized removal of the article 102 from the retail store facility 150.

During store hours, a customer 140 may desire to purchase the article 102. The customer 140 can purchase the article 102 using a fixed POS station (e.g., a checkout counter) or a mobile POS device (e.g., a Smartphone) 104. The mobile POS device 104 can be in the possession of the customer 140 or a store associate 142 at the time of a purchase transaction. Fixed POS stations/devices are well known in the art, and therefore will not be described herein. Still, it should be noted that both the fixed and mobile POS stations/devices have retail transaction applications installed thereon that are configured to facilitate the purchase of article 102 and the deactivation of the RFID tag 132 from article 102. Standards for product tagging call for chips to have a switch that can be activated by a code to deactivate the tag. Deactivating the RFID tag 132 generally refers to deactivating the microchip itself using an electronic code or other means, or at least removing or erasing a portion of the data stored in the RFID tag 132 (e.g., an electronic product code). However, deactivating the RFID tag 132 can eliminate all or some of the functionality and the benefits that can be obtained through RFID technology (e.g., consumer benefits such as automated registration of products, automated interactions of other articles with the purchased items, consumer tracking and cataloging of purchased articles using RFID systems, and automated safety systems). The retail transaction applications can be pre-installed applications, add-on applications or plug-in applications.

In all scenarios, the retail transaction applications facilitate the exchange of data between the article 102, RFID tag 132, customer 140, store associate 142, and/or Retail Transaction System ("RTS") 118. For example, after a retail transaction application is launched, a user 140, 142 is prompted to start a retail transaction process for purchasing the article 102. The retail transaction process can be started by performing a user software interaction, such as by depressing a key on a keypad of the POS station/device 104 or touching a button on a touch screen display of the POS station/device 104.

Subsequently, the user 140, 142 may manually input article information into the retail transaction application. Alternatively or additionally, the user 140, 142 places a RFID tag reader (not shown in FIG. 1) of the POS station/device 104 in proximity of article 102. As a result of this placement, the POS station/device 104 obtains article information from the RFID tag 132 attached to the article 102. The article information includes any information that is useful for purchasing the article 102, such as an article identifier and an article purchase price. In some scenarios, the article information may even include an identifier of the RFID tag 132 attached thereto. The article information can be communicated from the article 102 to the POS station/device 104 via an SRC, such as a barcode communication 122 or an NFC 120.

In the barcode scenario, the article 102 has a barcode 128 attached to an exposed surface thereof. The term "barcode", as used herein, refers to a pattern or symbol that contains embedded data. Barcodes may include, for example, one-dimensional barcodes, two dimensional barcodes (such as matrix codes, Quick Response ("QR") codes, Aztec codes and the like), or three-dimensional bar codes. The barcode 128 is read by a barcode scanner/reader (not shown in FIG. 1) of the POS station/device 104. Barcode scanners/readers are well known in the art. Any known or to be known barcode scanner/reader can be used herein without limitation.

In the NFC scenarios, the article 102 may comprise an SRC enabled device 126. The SRC enabled device 126 can be separate from RFID tag 132 or comprise RFID tag 132. An SRC communication 120 occurs between the SRC enabled device 126 and the POS station/device over a relatively small distance (e.g., N centimeters or N inches, where N is an integer such as twelve). The SRC communication 120 may be established by touching components 126, 104 together or bringing them in close proximity such that an inductive coupling occurs between inductive circuits thereof. In some scenarios, the NFC operates at 13.56 MHz and at rates ranging from 106 kbit/s to 848 kbit/s. The NFC may be achieved using NFC transceivers configured to enable contactless communication at 13.56 MHz or 928 MHz. NFC transceivers are well known in the art, and therefore will not be described in detail herein. Any known or to be known NFC transceivers can be used herein without limitation.

After the POS station/device 104 obtains the article 102 information, payment information is input into the retail transaction application by the user 140, 142. Payment information can also be transmitted to the retail transaction application via a credit card machine at the POS station/device 104. Upon obtaining the payment information, the POS station/device 104 automatically performs operations for establishing a retail transaction session with the RTS 118. Retail transaction sessions are well known in the art, and therefore will not be described herein. Still, it should be noted that such retail transaction sessions can involve communicating information to and from the RTS 118 via an RF communication 124 and public network 106 (e.g., the Internet); and completing a purchase transaction by the RTS 118. When the purchase transaction is completed, a signal or message is generated and sent to the POS station/device 104 indicating whether the article 102 has been successfully or unsuccessfully purchased.

Aspects of the present disclosure concern methods for self-checkout within a particular geographic area (e.g., a retail store facility 150). Exemplary aspects of such methods will be discussed in detail below in relation to FIG. 3. Still, it should be understood that such methods are at least partially implemented by the RFID tags 132, an interrogator 144 (e.g., an RFID reader), and/or the retail transaction system 118. Interrogators are well known in the art, and therefore will not be described herein. Still, it should be understood that the interrogator 144 can be part of or can be separate from the POS station/device 104 and/or the monitoring system 134.

In various scenarios, the interrogator 144 is configured to communicate SRC signals or messages to and from the RFID tags 132. The SRC signals/messages can include, but are not limited to, command signals/messages instructing the RFID tags 132 to perform regular reporting operations and/or request signals/messages requesting that the RFID tag 132 provide certain information to the interrogator 144. The command signals/messages are employed during certain first applications, such as purchase transaction applications.

Figure 2:
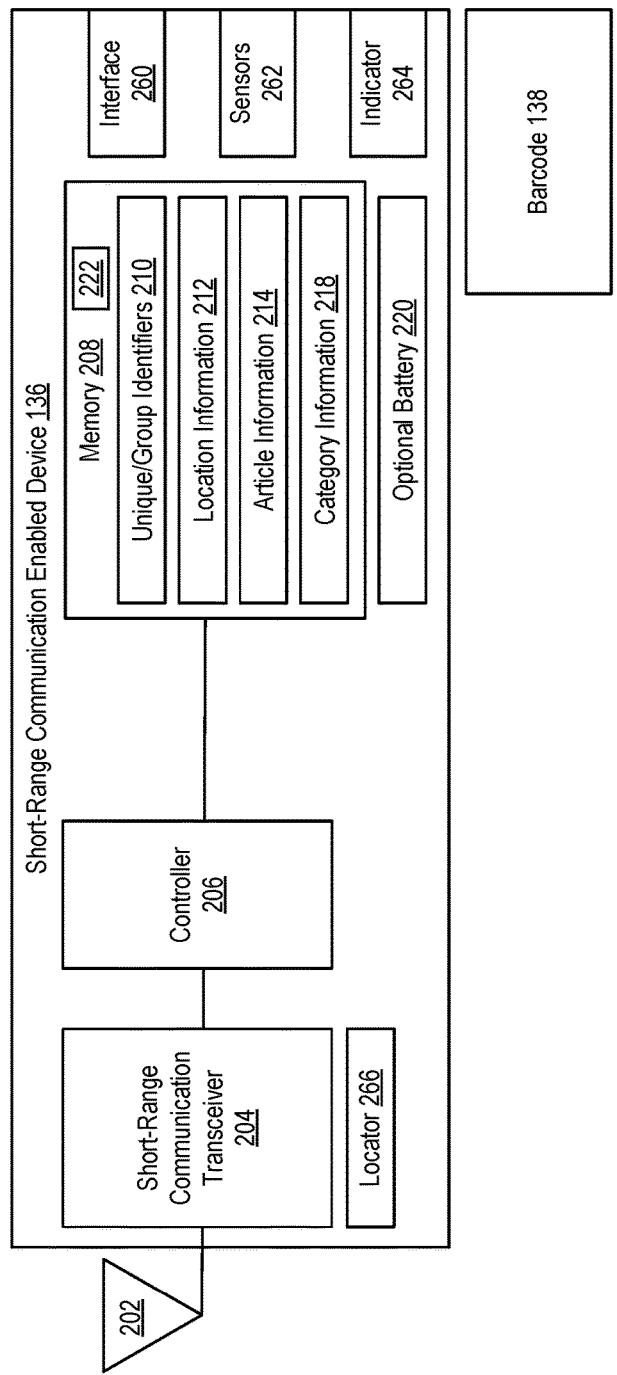
FIG. 2 is a schematic illustration of an exemplary RFID tag according to one aspect of the present disclosure.

An active RFID tag 132 is powered by an internal battery (e.g., battery 220 of FIG. 2). Therefore, the active RFID tag 132 can periodically or continuously perform sensing operations prior to deactivation of the tag. The sensing operations can involve: detecting movement of the RFID tag 132 and/or changes in a condition of a surrounding environment and/or setting a value of at least one reporting parameter (e.g., an RFID protocol session 1 parameter value, an RFID protocol session 2 parameter value, etc.) of the RFID tag 132 based on results of said detecting. The interrogator 144 can send information request messages addressed directly to the RFID tag 132 requesting provision of certain information (e.g., location of the RFID tag 132 within a geographic area, article information, and a unique identifier of the RFID tag 132).

In the passive RFID tag scenarios, the command signals/messages include information instructing the RFID tags 132 to perform special reporting operations, i.e., optionally provide a response signal/message indicating results of currently performed sensing operations to the interrogator 144. For example, in response to the reception of the second command signal/message, power is supplied to an electronic circuit of the RFID tag 132. In turn, the RFID tag 132 performs sensing operations. Thereafter, the interrogator 144 can send information request signals/messages addressed directly to the RFID tag 132 requesting provision of certain information.

The information contained in the response signals/messages can include, but is not limited to, information specifying the current location and/or past locations of the RFID tag 132 within the retail store facility 150. This location information may be forwarded from the interrogator 144 to the retail transaction system 118 for storage in a tracking sub-system 116. The response may also comprise article information and a unique identifier for the RFID tag 132. The location information, article information and/or unique identifier can be subsequently processed by the retail transaction system 118 to: generate a map, list, table or other display illustrating the locations of RFID tags 132 within the retail store facility 150; and/or generate a list, table or graph specifying a current inventory of the retail store facility 150.

Notably, the above described novel methods of self-checkout overcome certain drawbacks of conventional RFID tag 132 tracking techniques. For example, the disclosed aspects provide a way to quickly track employees and equipment that are moving within the retail store facility 150 without having to use multiple physical zones or independent methods for determining RFID tag motion. Also, these novel methods ensure that a limited amount of information is provided by the RFID tags 132 in response to interrogation by the interrogator 144 at any given time. Accordingly, the disclosed aspects provide a means to reduce the amount of information provided by the RFID tags 132 customized in a given environment to information of interest.

Implementation of the methods of the present disclosure requires minimal modifications to conventional interrogators and/or RFID tags 132. Additionally or alternatively, custom signals/messages can be employed. In this case, minimal software modifications are required to be made to the conventional interrogators. In various interrogator scenarios, at least one sensing device likely needs to be added to the RFID tag 132 with an SRC communication capability or directly to an SRC chip of the RFID tag 132 by changing the SRC chip to include the sensor. Software modifications to the RFID tag 132 may also be needed for allowing the RFID tag 132 to process the custom signals/messages.

Referring now to FIG. 2, there is provided a schematic illustration of an exemplary architecture for RFID tag 132. An RFID tag 132 can include more or less components than that shown in FIG. 2. However, the components shown are sufficient to disclose an illustrative aspect. Some or all of the components of the RFID tag 132 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an aspect of a representative RFID tag 132 configured to facilitate the self-checkout process. In this regard, the RFID tag 132 may have a barcode 138 affixed thereto and/or an SRC enabled device 136 for allowing data to be exchanged with an external device (e.g., monitoring system 134, POS station/device 104, and/or interrogator 144 of FIG. 1) via barcode technology and/or NFC technology.

The SRC enabled device 136 comprises an antenna 202 for allowing data to be exchanged with the external device (e.g., monitoring system 134, POS station/device 104, and/or interrogator 144 of FIG. 1) via SRC technology. The antenna 202 is configured to receive SRC signals from the external device and transmit SRC signals generated by the SRC enabled device 136. The SRC enabled device 136 comprises an SRC transceiver 204. SRC transceivers are well known in the art, and therefore will not be described herein. However, it should be understood that the SRC transceiver 204 processes received SRC signals to extract information therefrom. This information can include, but is not limited to, command signals/messages instructing the RFID tag 132 to perform regular reporting operations and request signals/messages requesting that the RFID tag 132 provide certain information (e.g., a unique identifier 210, location information 212, article information 214, and/or category information 218). The SRC transceiver 204 may pass the extracted information to the controller 206.

At the controller 206, the information may be pre-processed for decrypting the same if it was received in an encrypted form. The information may also be pre-processed to determine whether the SRC signal is to be handled by the RFID tag 132, i.e., to verify that the SRC signal is directed or targeted to the RFID tag 132. Such a determination can be made by comparing an identifier contained in the SRC signal to the unique/group identifier(s) 210 stored in memory 208. If the identifiers match each other, then it is determined that the SRC signal is intended to be handled by the RFID tag 132. The information may further be pre-processed to identify the type of information contained in the SRC signal, i.e., whether or not the SRC signal includes a regular reporting command signal/message or a request for certain information.

If the extracted information includes a request for certain information, then the SRC enabled device 136 obtains the requested information. For example, the SRC enabled device 136 generates and sends a response containing only pre-determined information. In this case, only the information of interest (e.g., article category) would be transmitted in response to the received request. As such, the time spent by the external device receiving only the information of interest is maximized. Furthermore, interrogators at store exits and other locations can track the small number of moving RFID tags 132 and provide proper control and inventory tracking. Additionally, techniques such as Doppler Effect or phase detection become effective as well as physical zone detection. The number of false positive alarms is greatly reduced and the accuracy of detection of real theft becomes increased.

The RFID tag 132 may further include at least one sensor 262. The sensor 262 can include, but is not limited to, an accelerometer, a vibration sensor, a gyroscope, a temperature sensor, a light sensor, an electric or magnetic field sensor, and/or a moisture sensor.

If it is determined that the RFID tag 132 should respond to the request, then the controller 206 retrieves at least the category information 218 from memory 208. The retrieved information is then sent from the RFID tag 132 to a requesting external device (e.g., monitoring system 134 of FIG. 1) via an SRC communication. If the extracted information contains a request for information as opposed to a reporting command, then the SRC enabled device 136 performs information retrieval operations. For example, the SRC enabled device 136 retrieves the requested information from memory 208. The requested information can include, but is not limited to, the unique/group identifier(s) 210, location information 212, article information 214, and/or category information 218. The unique identifier 210 includes information that uniquely identifies the RFID tag, such as string of digits or alphanumerics. The article information 214 can include a unique identifier of an article, a purchase price of the article, and/or information specifying at least one characteristic of the article. The location information 212 can include information specifying the current location of the RFID tag 132 within a specified area (e.g., a retail store facility 150 of FIG. 1) and/or at least one previous location of the RFID tag 132 within the specified area. Such location information can be generated by a locator 266 contained within the SRC enabled device 136. The locator 266 is operative to determine locations of the RFID tag 312 via a triangulation technique, a time of flight technique or a Global Positioning System ("GPS") technique. Each of these listed techniques is well known in the art, and therefore will not be described herein. The category information 218 can include a unique category to which a particular article belongs (e.g., "Meat", "Dairy", "Books", "Toys", and the like).

In some scenarios, the connections between components 204, 206, 208, 260, 262, 264, 266 are unsecure connections and/or secure connections. The phrase "unsecure connection", as used herein, refers to a connection in which cryptography and/or tamper-proof measures are not employed. The phrase "secure connection", as used herein, refers to a connection in which cryptography and/or tamper-proof measures are employed. Such tamper-proof measures include enclosing the physical electrical link between two components in a tamper-proof enclosure.

Notably, the memory 208 may be a volatile memory and/or a non-volatile memory. For example, the memory 208 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 208 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The components 204-208, 260-266 and a battery 220 may be collectively referred to herein as the SRC enabled device 136. The SRC enabled device 136 is coupled with an optional power source. The power source may include, but is not limited to, battery 220 or an A/C power connection (not shown). The status of the power source can be continuously or periodically monitored by controller 206. Alternatively or additionally, the SRC enabled device 136 is configured as a passive device which derives power from an RF signal inductively coupled thereto.

Figure 3:
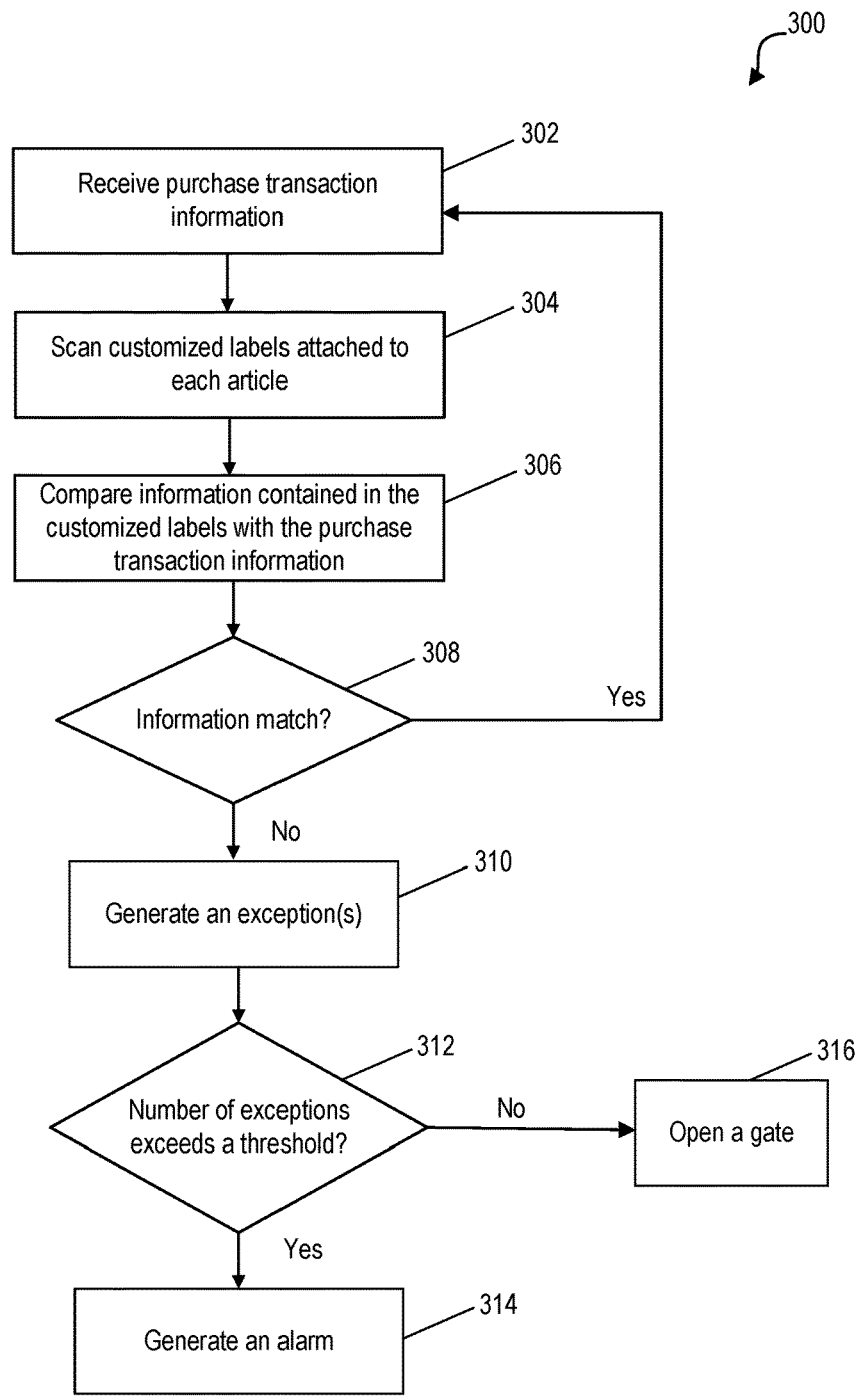
FIG. 3 is an example of a flow diagram of a method for self-checkout at a retail establishment according to an aspect of the present disclosure.

FIG. 3 is an example of a flow diagram of a method for self-checkout at a retail establishment according to an aspect of the present disclosure. FIGS. 1 and 2 may be referenced in combination with the flowchart of FIG. 3. To start, method 300 includes one or more sensor gates that could be components of the monitoring system 134 and one or more payment processing devices, such as POS stations/devices 104, configured to facilitate the purchase of one or more articles 102.

At step 302, the monitoring system 134 can receive purchase transaction information from the POS device 104. As noted above, the POS stations/devices 104 have retail transaction applications installed thereon that are configured to facilitate the purchase of article 102. The retail transaction applications can be pre-installed applications, add-on applications or plug-in applications. The retail transaction applications facilitate the exchange of data between the article 102, RFID tag 132, customer 140, store associate 142, and/or Retail Transaction System ("RTS") 118. After the POS station/device 104 obtains the article(s) information, payment information is input into the retail transaction application by the user 140, 142. Upon obtaining the payment information, the POS station/device 104 automatically performs operations for establishing a retail transaction session with the RTS 118. When the purchase transaction is completed, the purchase transaction information is generated and sent to the POS station/device 104 indicating whether the article 102 has been successfully or unsuccessfully purchased. In some aspects, the purchase transaction information stored by the POS station/device 104 does not include any customer specific information, but can, among other things, include the identity and price of each article that was purchased by the customer during a particular purchase transaction. Other information that can be stored by the POS station/device 104 can include the date of the purchase and the store at which the purchase was made.

At step 304, when the user 140,142 enters the surveillance zone monitored by the monitoring system 134 (e.g., exit of the retail store facility 150), the monitoring system 134 can scan customized RFID tags 132 attached to each article 102. Each RFID tag 132 can be pre-encoded with customized information identifying the article 102 in some form. In one aspect, the customized information can include article information 214 (which can include value of the article 102), and/or category information 218. For example, the customized information may identify the article 102 as meat category or as meat over $10 (category and value). In some cases, the customized information can include just the category or just the value of the article 102 (for example, article over $10, $20, and the like). As described above in conjunction with FIG. 2, the RFID tag 132 can include the antenna system 202 for allowing data to be exchanged with the external device, a radio section (SRC transceiver 204 that is configured to process received SRC signals to extract information therefrom), a power management section (battery 220 or an A/C power connection not shown in FIG. 2), a logical section (controller 206), and a memory (e.g., memory 208 of FIG. 2). RFID tags 132 with an energy storage device are known as active or semi-active tags. Some RFID tags 132 can be powered solely by the RF signal it receives. Such RFID tags 132 do not include an energy storage device, and are called passive tags.

At step 306, as part of processing received information, the monitoring system 134 can compare customized information received from the scanned RFID tags 132 with the purchase transaction information received from the POS stations/devices 104. For example, the monitoring system 134 may obtain the total price of all articles 102 purchased by the customer 140 and compare the total price to the total of all prices received from the scanned RFID tags 132.

If information (e.g., prices) all match each other (step 308, "Yes" branch) than this is not a theft and the monitoring system returns to step 302 to obtain the purchase transaction information for the next customer 140 entering the surveillance area. However, if the compared information does not match (step 308, "No" branch), the monitoring system 130 can generate one or more exceptions. For example, if the RFID tag 132 indicates that the article 102 is from this retailer's inventory but purchase of this article 102 is not recorded in the transaction information, then this is potentially an attempted theft and the exception is preferably generated. In an aspect, the monitoring system 132 can generate an exception for each article 102 in a specific category not recorded in the transaction information. For instance, the monitoring system 130 can generate an exception for each article 102 having a value of more than $20 not recorded in the transaction information.

At step 312, the monitoring system 134 can determine if the number of generated exceptions exceeds a predefined threshold. In other words if a potential attempted theft is detected, the monitoring system 134 can try to determine the severity of the attempted theft. For example, at step 312, the monitoring system 134 can determine if there are more than three mismatched articles 102 having a value over $10.

At step 314, in response to determining that the number of generated exceptions exceeds the predefined threshold (step 312, "Yes" branch), the monitoring system 134 can trigger an alarm. In one aspect, at step 314, the monitoring system 134 can enable an alarm siren, light, camera and can initiate other security actions.

In an aspect, at step 316, in response to determining that the number of generated exceptions does not exceed the predefined threshold (step 312, "No" branch), the monitoring system 134 can open a gate to enable the customers 140 to pass through the sensor gates (e.g., RFID gates) and to the outside of the surveillance area.

Advantageously, the disclosed aspects enable mixed infrastructure where self-checkout devices can be mixed with staffed checkout at retail store facilities 150. In an aspect, customer handheld devices of choice can be used for interaction and for self-checkout purposes. The disclosed implementation does not require broad scale article level RFIDs. As a result, the monitoring system 134 can perform monitoring without using a database, which can accelerate the monitoring process.

In other words, the method 300 includes a method for self-checkout at a retail establishment. One aspect of the method includes receiving, by a sensor gate (one of the components of the monitoring system 134) and from a payment processing device, purchase transaction information related to a purchase by a customer. The sensor gate scans a customized label attached to each article possessed by the customer located in a surveillance zone of the retail establishment. The sensor gate compares information contained in the customized label with the received purchase transaction information.

In one or any combination of these aspects, the sensor gate generates one or more exceptions, in response to determining that the information contained in the customized label does not match the received purchase transaction information.

In one or any combination of these aspects, the transaction information includes at least one of: a number of articles purchased by the customer during the purchase transaction, price of each article purchased during the purchase transaction, category of each article purchased during the purchase transaction.

In one or any combination of these aspects, the customized label includes at least one of: a price of the corresponding article and a category of the corresponding article.

In one or any combination of these aspects, scanning the customized label further includes: interrogating the customized label using the sensor gate having a Radio Frequency IDentification (RFID) microchip, an RFID reader for interrogating the customized label, and an antenna operatively coupled to the RFID microchip and operatively coupled with the RFID reader for communicating with each customized label attached to the article possessed by the customer.

In one or any combination of these aspects, an alarm is generated, by the sensor gate, in response to determining that a number of generated exceptions exceeds a predetermined threshold.

In one or any combination of these aspects, the sensor gate is opened, in response to determining that a number of generated exceptions is less than the predetermined threshold.

In one or any combination of these aspects, comparing the information by the sensor gate further comprises selectively comparing only information related to a predefined category of articles.

Figure 4:
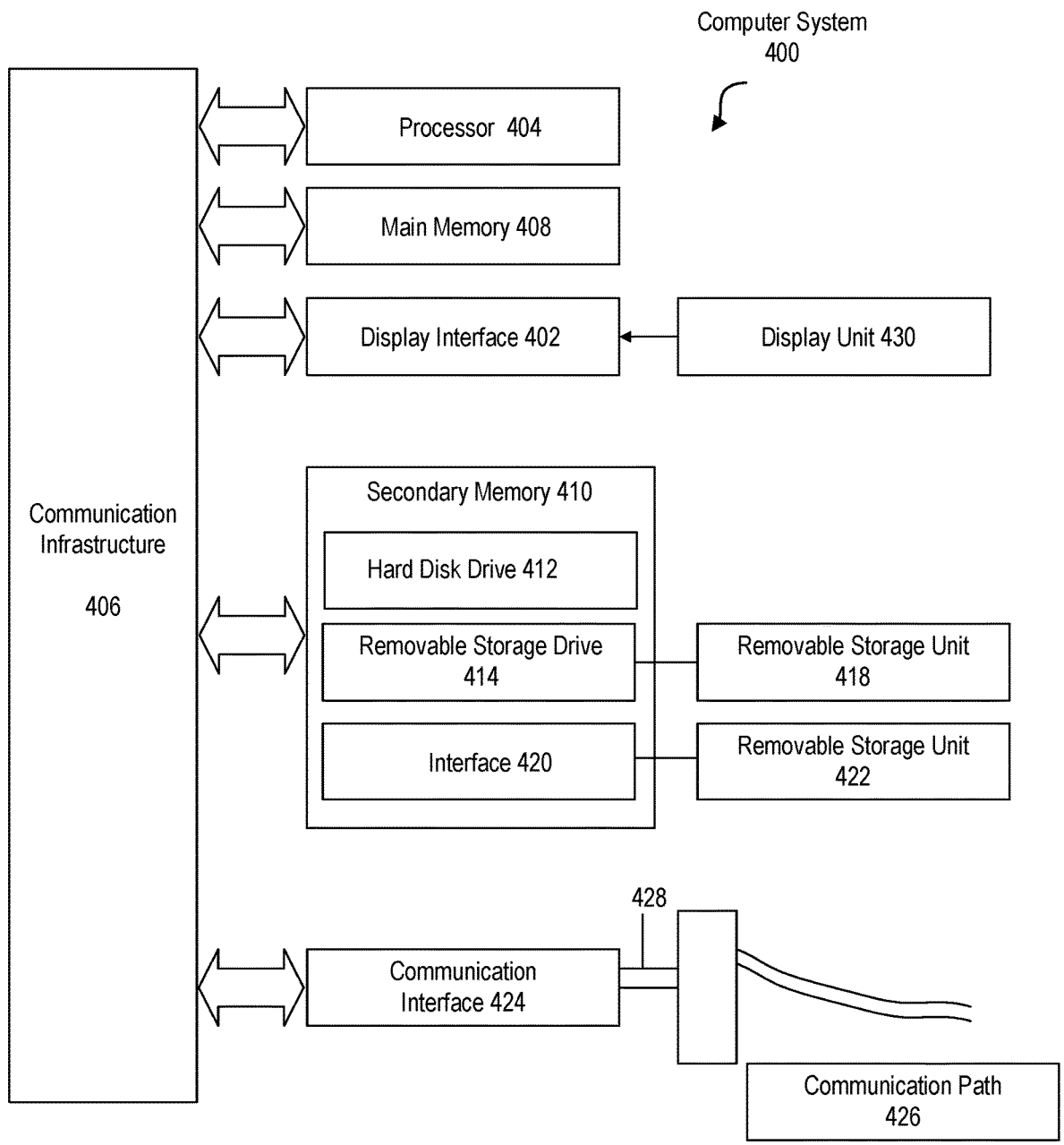
FIG. 4 is a block diagram of various hardware components and other features of a computer system that enables self-checkout at a retail establishment in accordance with aspects of the present disclosure.

FIG. 4 presents an example system diagram of various hardware components and other features that can be used in accordance with aspects of the present disclosure. Aspects of the present disclosure can be implemented using hardware, software, or a combination thereof and can be implemented in one or more computer systems or other processing systems. In one example variation, aspects of the disclosure are directed toward one or more computer systems capable of carrying out the functionality described herein. An example of such a computer system 400 is shown in FIG. 4.

Computer system 400 includes one or more processors, such as processor 404. The processor 404 is connected to a communication infrastructure 406 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 404, or any other "processor," as used herein, processes signals and performs general computing and arithmetic functions. Signals processed by the processor can include digital signals, data signals, computer instructions, processor instructions, messages, a bit, a bit stream, or other computing that can be received, transmitted and/or detected.

Communication infrastructure 406, such as a bus (or any other use of "bus" herein), refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a bus that interconnects components inside a access control system using protocols, such as Controller Area network (CAN), Local Interconnect Network (LIN), Wiegand and Open Supervised Device Protocol (OSDP) among others.

Further, the connection between components of computer system 400, or any other type of connection between computer-related components described herein can be referred to an operable connection, and can include a connection by which entities are operably connected, such that signals, physical communications, and/or logical communications can be sent and/or received. An operable connection can include a physical interface, a data interface and/or an electrical interface.

Computer system 400 can include a display interface 402 that forwards graphics, text, and other data from the communication infrastructure 406 (or from a frame buffer not shown) for display on a display unit 430. Computer system 400 also includes a main memory 408, preferably random access memory (RAM), and can also include a secondary memory 410. The secondary memory 410 can include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414. As will be appreciated, the removable storage unit 418 includes a computer usable storage medium having stored therein computer software and/or data.

In alternative aspects, secondary memory 410 can include other similar devices for allowing computer programs or other instructions to be loaded into computer system 400. Such devices can include, for example, a removable storage unit 422 and an interface 420. Examples of such can include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

It should be understood that a memory, as used herein can include volatile memory and/or non-volatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 400 can also include a communications interface 424. Communications interface 424 allows software and data to be transferred between computer system 400 and external devices. Examples of communications interface 424 can include a modem, a network interface (such as an Ethernet card), a communications port, a Personal Computer Memory Card International Association (PCMCIA) slot and card, etc. Software and data transferred via communications interface 424 are in the form of signals 428, which can be electronic, electromagnetic, optical or other signals capable of being received by communications interface 424. These signals 428 are provided to communications interface 424 via a communications path (e.g., channel) 426. This path 426 carries signals 428 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 414, a hard disk installed in hard disk drive 412, and signals 428. These computer program products provide software to the computer system 400. Aspects of the disclosure are directed to such computer program products.

Computer programs (also referred to as computer control logic) are stored in main memory 408 and/or secondary memory 410. Computer programs can also be received via communications interface 424. Such computer programs, when executed, enable the computer system 400 to perform various features in accordance with aspects of the present disclosure, as discussed herein. In particular, the computer programs, when executed, enable the processor 404 to perform such features. Accordingly, such computer programs represent controllers of the computer system 400.

In variations where aspects of the disclosure are implemented using software, the software can be stored in a computer program product and loaded into computer system 400 using removable storage drive 414, hard drive 412, or communications interface 420. The control logic (software), when executed by the processor 404, causes the processor 404 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for self-checkout at a retail establishment comprising:
    receiving, by a sensor gate and from a payment processing device, purchase transaction information related to a purchase by a customer;
    requesting, by the sensor gate, that a customized label attached to each article possessed by the customer located in a surveillance zone of the retail establishment provides only value and/or category information of a corresponding article;
    receiving, by the sensor gate and from the customized label, only the value and/or category information;
    comparing, by the sensor gate, the value and/or category information contained in the customized label with the purchase transaction information;
    generating an alarm in response to determining that the value and/or category information does not match the purchase transaction information; and
    opening the sensor gate in response to determining that the value and/or category information matches the purchase transaction information.

2. The method of claim 1, further comprising:
    generating one or more exceptions, by the sensor gate, in response to determining that the value and/or category information contained in the customized label does not match the purchase transaction information.

3. The method of claim 1, wherein the purchase transaction information includes at least one of: a number of articles purchased by the customer during the purchase, a price of each article purchased during the purchase, and a category of each article purchased during the purchase.

4. The method of claim 1, wherein requesting that the customized label provides only the value and/or category information further comprises:
    interrogating the customized label using the sensor gate having a Radio Frequency IDentification (RFID) microchip, and an RFID reader for interrogating the customized label.

5. The method of claim 2, wherein generating the alarm comprises generating the alarm, by the sensor gate, in response to determining that a number of the one or more exceptions exceeds a predetermined threshold.

6. The method of claim 5, wherein opening the sensor gate comprises opening the sensor gate, in response to determining that the number of the one or more exceptions is less than the predetermined threshold.

7. The method of claim 1, wherein comparing the value and/or category information by the sensor gate further comprises selectively comparing only information related to a predefined category of articles.

8. A system for self-checkout at a retail establishment comprising:
    a sensor gate having a hardware processor configured to:
        receive, from a payment processing device, purchase transaction information related to a purchase by a customer;
        request that a customized label attached to each article possessed by the customer located in a surveillance zone of the retail establishment provides only value and/or category information of a corresponding article;
        receive, from the customized label, only the value and/or category information;
        compare the value and/or category information contained in the customized label with the purchase transaction information;
        generate an alarm in response to determining that the value and/or category information does not match the purchase transaction information; and
        open the sensor gate in response to determining that the value and/or category information matches the purchase transaction information.

9. The system of claim 8, wherein the hardware processor is further configured to:
    generate one or more exceptions, in response to determining that the value and/or category information contained in the customized label does not match the purchase transaction information.

10. The system of claim 8, wherein the purchase transaction information includes at least one of: a number of articles purchased by the customer during the purchase, a price of each article purchased during the purchase, and a category of each article purchased during the purchase.

11. The system of claim 8, wherein the hardware processor configured to request that the customized label provides only the value and/or category information is further configured to:
    interrogate the customized label using the sensor gate having a Radio Frequency IDentification (RFID) microchip, an RFID reader for interrogating the customized label, and an antenna operatively coupled to the RFID microchip and operatively coupled to the RFID reader for communicating with the customized label attached to each article possessed by the customer.

12. The system of claim 9, wherein the hardware processor configured to generate the alarm is further configured to generate the alarm, in response to determining that a number of the one or more exceptions exceeds a predetermined threshold.

13. The system of claim 12, wherein the hardware processor configured to open the sensor gate is further configured to open the sensor gate, in response to determining that the number of the one or more exceptions is less than the predetermined threshold.

14. The system of claim 8, wherein the hardware processor configured to compare the value and/or category information is further configured to selectively compare only information related to a predefined category of articles.

* * * * *